United States Patent Office 2,869,977
Patented Jan. 20, 1959

2,869,977

PROCESS FOR SPINNING PARTICULATE DISPERSIONS

George A. Richter, Jr., Abington, Pa., and George L. Brown, Moorestown, N. J., assignors to Rohm & Haas Company, Philadelphia, Pa., a corporation of Delaware No Drawing. Application February 19, 1954
Serial No. 411,562

16 Claims. (Cl. 18—54)

This invention deals with a process for forming filaments and like shaped products from aqueous dispersions of thermoplastic resins. It is concerned with the formation of relatively strong, self-supporting fibers and films of thermoplastic, linear, polymeric products which have apparent second order transition temperatures from about 25° to about 100° C. and which contain hydrolyzable or available reactive polar groups, by starting with an aqueous dispersion of a said polymeric product and shaping it with the aid of a coagulating bath and fuse-drying the shaped product. In a preferred aspect of this invention the shaped products are rendered stable above their apparent second order transition temperatures as will be hereinafter more fully described. The shaped products are oriented by stretching.

It has been proposed to coagulate in a salt solution non-elastic thermoplastic resinous materials, such as polymers of vinylidene chloride, from aqueous dispersions thereof in the form of more or less continuous or discontinuous filaments or rods which could be washed free of soluble impurities or contaminants. The thus purified coagulate was molded or extruded to give light colored, clear products. The proposed method was not directed to the preparation of relatively strong, self-supporting filaments, fibers, or films for use as such.

It has also been proposed to form filaments from aqueous dispersions of polytetrafluoroethylene having dispersed particles of ribbon-like structure at least in part. Preparation of such dispersions demanded a particular type of dispersing agent. Also, the processing of extruded material required critical conditions of forming and handling, including high temperature sintering.

One of the objects of the present invention is to provide strong, cohesive, self-supporting filaments, threads, and films. Another object is the formation of such shaped products from aqueous dispersions of thermoplastic polymeric materials. It is also an object to provide a process whereby such dispersions are used to form the said shaped products by simple, economically desirable steps. It is also an object to form strong, self-supported filaments and films which are stable above the apparent second order transition temperatures of the polymeric substances of which they are formed, thus preventing retraction of filaments and films when they are heated.

These and other objects which are evident from the descriptive matter herein presented are accomplished by forming an aqueous dispersion of a thermoplastic, synthetic, polymeric product, as will be further defined below, passing said dispersion through a jet or orifice or spinnerette into and through a coagulating bath to form a self-supporting shaped product, washing said shaped product, heating the washed product, whereby it is dried and polymeric particles thereof are joined together, and stretching the resulting product in a heated state. If the resulting product is to be used in this form, it is now cooled below the second order transition temperature. If further treatment or processing is to be used, a positive cooling step is not essential. In a peferred process the product is treated chemically to stabilize it.

With respect to the thermoplastic polymeric materials which can be used in the process of this invention there are some essential factors which help define these resins. The dispersed polymeric materials which are used possess non-crystalline linear molecules of large molecular weight and are capable of being oriented. In general, the resins have molecular weights of 50,000 to 2,000,000. They have an apparent second order transition temperature between about 25° and about 100° C., better between 30° and 85° C., and best from 40° to 70° C. The polymers are capable of being formed by emulsion polymerization to give aqueous dispersions in which the dispersed particles have sizes less than about two microns and are preferably below about 0.1 micron in average particle size.

The aqueous dispersions must have sufficient stability to permit their passage through a capillary, nozzle, or jet without mechanical coagulation being caused therein so as to restrict or clog the capillary, opening, or orifice. Aqueous dispersions having this necessary property are here defined as stable. The dispersions must also contain at least 20% of the dispersed thermoplastic polymer and may contain up to about 65% of such polymer, close to the concentration at which gelation theoretically takes place. They preferably contain 30% to 50% thereof. As solids content decreases, at least in the lower range of such content, ease of spinning in general also decreases until below 20% dispersed solids self-supporting continuous filaments or films are no longer readily obtainable.

The dispersions of thermoplastic resins here used are obtained by emulsifying a monomer or a mixture of monomers, said monomer or monomers being mono-vinylidene compounds polymerizable under the action of a free radical catalyst, and polymerizing the thus formed emulsion under the influence of a free-radical catalyst, usually in a redox system. The polymeric product when isolated and dried must have an apparent second order transition temperature, $Tg$, within the above recited range. Mixtures of dispersions of different polymers and/or copolymers may also be used.

The aparent second order transition temperature ($Tg$) is defined as that temperature at which the first derivative of thermodynamic variables, such as coefficient of expansion or heat capacity, changes abruptly. This transition temperature is an inflection temperature which is conveniently found by plotting the modulus of rigidity against temperature. A convenient method for determining such modulus and transition temperature is described by Williamson, British Plastics 23, 87–90. The $Tg$ values here used are generally those temperatures at which the modulus is 300 kg./cm.$^2$ Acrylonitrile, methacrylonitrile, vinylchloride, and styrene give homopolymers having $Tg$ values too high to be useful in this invention. Methyl methacrylate is almost borderline, giving a $Tg$ value of about 105° C. On the other hand, polymers of various alkyl acrylates, many alkyl methacrylates and water-insoluble polyvinyl ethers exhibit $Tg$ values too low to yield desirable fibers. Nevertheless, useful copolymers are often obtained by bringing together the two types of monomers, and forming copolymers therefrom with the proper $Tg$ values.

For example, from methyl methacrylate and methyl acrylate, neither of which normally gives homopolymers with requisite properties for providing desirable fibers from aqueous dispersions, there can be prepared a whole series of copolymers which do have these properties. Thus, a copolymer from 94% methyl methacrylate and 6% methyl acrylate by weight has a $Tg$ value of about 100° C.; an 80:20 copolymer has a Tg of 80° C.; a 60:40 copolymer has a Tg of 66° C.; a 40:60 copolymer has a Tg of 46° C.; and a 20:80 copolymer has a Tg of 26° C. All of these copolymers can be spun from stable dispersions thereof and yield useful fibers and films.

Another typical series of copolymers which are spinnable from aqueous dispersions by the process of this invention can be prepared from methyl methacrylate and ethyl acrylate in such proportions as to give Tg values from about 100° to about 25° C. Thus, a spinnable copolymer from 95% methyl methacrylate and 5% ethyl acrylate by weight has a Tg of 98° C., one from 90% methyl methacrylate and 10% ethyl acrylate 91° C., one from 70% methyl methacrylate and 30% ethyl acrylate 64° C., one from 50% of each 37° C., and one from 40% methyl methacrylate and 60% ethyl acrylate 24° C., which is a borderline case. In place of methyl or ethyl acrylates used above, mixtures thereof may be used or these acrylates may be replaced with other alkyl acrylates in suitable proportions to give copolymers having the required Tg values.

Some typical copolymer compositions of this sort, starting with methyl methacrylate and propyl acrylate are 90:10 (Tg, 95° C.), 80:20 (Tg, 79° C.), 60:40 (Tg, 55° C.), and 40:60 (Tg, 29° C.).

Similarly, alkyl methacrylates starting with ethyl methacrylate may be copolymerized with methyl methacrylate. Useful copolymers can be made with methylmethacrylate and ethyl methacrylate in proportions such as 90:10 (Tg, 100° C.), 70:30 (Tg, 91° C.), 50:50 (Tg, 81° C.), 40:60 (Tg, 77° C.), 20:80 (Tg, 67° C.), 10:90 (Tg, 63° C.). Ethyl methacrylate by itself gives polymers which are spinnable having Tg values of about 58° C. This is also true for the propyl methacrylates, the Tg value of the n-propyl ester being 41° C.

Useful copolymers are obtained with methyl methacrylate up to 90% thereof with 10% propyl methacrylate (Tg, 99° C.). Other useful copolymers are obtained from methyl methacrylate and propyl methacrylate in an 80:20 ratio (Tg, 92° C.), or 70:30 (Tg, 86° C.), 50:50 (Tg, 73° C.), 30:70 (Tg, 60° C.), or 10:90 (Tg, 47° C.) ratios.

A copolymer from methyl methacrylate and n-butyl methacrylate in a 90:10 weight ratio has a Tg value of 93° C. and can be spun from dispersions. This is true also for other ratios, such as 80.20 (Tg 86° C.), 60:40 (Tg, 70° C.), 40:60 (Tg, 55° C.), 20:80 (Tg, 40° C.), and 10:90 (Tg, 33° C.). Polymers of butyl methacrylate have a Tg value of about 25° C. and with care can be spun from dispersions of polybutyl methacrylate. Higher n-alkyl methacrylates can be used only as components of copolymers.

Another interesting series of spinnable copolymers is based on ethyl methacrylate and butyl methacrylate. Representative proportions with the second order transition temperatures of the copolymers therefrom are 90:10 (Tg, 55° C.), 80:20 (Tg, 51° C.), 70:30 (Tg, 48° C.), 50:50 (Tg, 41° C.), 30:70 (Tg, 35° C.), and 10:90 (Tg, 28° C.).

Polymers and copolymers from acrylic and methacrylic esters are probably of greatest interest for a number of reasons. One reason is that these polymeric materials have unusual stability against light and oxygen and are colorless. Yet into the copolymers based on such esters there may be introduced groups from other polymerizable monovinylidene compounds, such as alkyl itaconates, styrene, vinyl ethers, and vinyl esters without destroying the valuable properties inherently possessed by the acrylic resins. Copolymers of esters and acrylonitrile or methacrylonitrile may be made which have required properties and which have good resistance to discoloration and other changes, particularly when the nitrile portion is not over 55% by weight.

Vinyl esters as major components are not as favorable as acrylic or methacrylic esters, but, nevertheless, aqueous dispersions based thereon can be spun. A typical copolymer was prepared in aqueous dispersion from vinyl acetate, methyl acrylate, and ethyl acrylate in a ratio of 75:15:10. It has a Tg of about 25° C. and spun well. Another copolymer from these starting monomers, but in a ratio of 80:10:10 spun well but was slightly soft, having a Tg below 25° C. As a result, there was noted some retraction of the stretched yarn therefrom after it was cooled to room temperature. While properly proportioned copolymers based on vinyl acetate or propionate can be spun to give useful products, they lack some of the valuable properties of copolymers based chiefly on acrylic or methacrylic esters.

Another sort of polymerizable monovinylidene component includes methacrylonitrile and acrylonitrile, which can be copolymerized with a great variety of polymerizable monovinylidene compounds such as ethyl, propyl, butyl, or octyl acrylate, or butyl, amyl, hexyl, or octyl methacrylate or ethoxyethyl or butoxyethyl acrylate, or methacrylate. The polymerizable nitriles suffer from some disadvantageous properties such as a tendency to develop color under some conditions. For this reason, they differ from the above esters and yet they form copolymers which can be readily spun from aqueous dispersions.

A series of spinnable dispersions can be made, for example, from acrylonitrile and ethyl acrylate. Typical copolymers from these two materials may be made in ratios of 75:25 (Tg, 95° C.), 70:30 (Tg, 87° C.), 60:40 (Tg, 70° C.), 50:50 (Tg, 53° C.), 40:60 (Tg, 37° C.), 35:65 (Tg, 28° C.), and, of course, at any other ratio giving Tg values from about 25° to about 100° C.

Copolymers from more than two monomers may also be used. Thus, for extension of data obtained with copolymers based primarily on acrylonitrile and ethyl acrylate, 5-hydroxypentyl vinyl ether in an amount of 5% by weight was introduced as a third component. With ratios of acrylonitrile to ethyl acrylate to this ether of 60:35:5 a Tg value of about 45° C. was noted; with a ratio of 50:45:5, a Tg of 40°; with a ratio of 45:50:5, a Tg of 36°; with a ratio of 40:55:5, a Tg of 32° C.; and with a ratio of 35:65:5, a Tg of 28° C. All of these copolymers had excellent spinning properties from aqueous dispersions thereof.

A copolymer from 30% acrylonitrile and 70% methyl acrylate was found to have a Tg of 45° C. A copolymer from acrylonitrile, methyl acrylate, and glycidyl methacrylate in a ratio of 35:55:10 had a Tg of 39° C. On the other hand, a 25:75 copolymer from acrylonitrile and methyl acrylate exhibited a Tg of 39° C.

A copolymer from 35 parts of acrylonitrile, 45 parts of ethyl acrylate, and 20 parts of glycidyl methacrylate had a Tg of 38°. Another copolymer from these materials, but in a ratio of 45:35:20 had a Tg of 43° C.

Copolymers based on 20% to 55% of acrylonitrile or methacrylonitrile generally provide dispersions which exhibit good spinning properties. These are ocpolymerized with a polymerizable monovinylidene compound of lower Tg, particularly one which provides more reactive polar groups, such as ester or amide groups or other carboxylic groups.

A common chemical characteristic of the polymers and copolymers which can be utilized in spinning from dispersions thereof is the presence therein of at least one kind of readily hydrolyzable polar group, or the presence of a strongly polar group, particularly in a relatively water-insoluble component. These polar groups depend primarily on oxygen, nitrogen, or both of these elements. The hydrolyzable group or groups are capable of yielding alcoholic hydroxyl or carboxylic groups. It must be pointed out, however, that the polymeric materials are not converted en masse to products having these groups as the functional or reactive groups. Rather the presence of hydrolyzable polar groups appears to play some part in the spinning, coagulation, coalescence, and union of polymeric particles in order to form strong, self-supporting fibers and films which can be handled until good coalescence can be effected to give products of high tenacity. In large part this effect is to impart hydroplasticity through affinity for water. Apparently hydrolysis occurs as a skin effect and then but lightly. Such an effect would account for the superior results obtained with strongly alkaline coagulating baths, but this invention does not depend upon the hypothesis of such saponification or hydrolysis. It is not necessary that all of the components of a dispersed resin contain hydrolyzable polar groups, for a minor proportion of the monomers entering into a copolymer may be free of polar groups or contain a relatively stable, difficulty hydrolyzable group, such as an ether group. Again, needed polar groups such as hydroxyl or carboxyl may be supplied in limited proportions directly by monomers which can be emulsion-copolymerized with other water-insoluble polymerizable monovinylidene compounds. It must be further commented that no large proportion of a compound which has free hydroxyl or carboxylic groups and which is freely water-soluble can be incorporated in a copolymer formed by emulsion polymerization. On the other hand, a relatively water-insoluble, polymerizable, monovinylidene compound which contains the required kind of polar group, e. g. alcoholic hydroxyl or carboxyl, can be incorporated provided it permits formation of high polymer molecules. Hydroxypentyl vinyl ether provides a typical and useful mer, even though ethers of this type by themselves do not undergo appreciable polymerization with free-radical catalysts, which are used in emulsion polymerization.

Another type of reactive group which can be built into dispersed copolymers is the epoxy group, as is found in glycidyl acrylate or methacrylate. Epoxy groups in longer carbon chains are of even more interest than in the glycidyl groups.

Monomeric materials which may be used as units to build up the dispersed polymeric materials which can be used in the process of this invention are monovinylidene compounds which can be polymerized or at least copolymerized under the influence of a free radical catalyst. These materials include esters, ethers, amides, nitriles, aldehydes, ketones, hydroxyethers, hydroxy esters, ureido-containing ethers and esters, hydrocarbons, halides, anhydrides, acids, etc. Compounds containing a reactive substituent, such as carboxyl, hydroxyl, epoxy, isocyanato, or ureido group, and the like are of particular interest in providing mers (monomeric units entering into a polymer) which can be used in cross-linking.

Typical esters include alykyl acrylates, methacrylates, thioacrylates, and itaconates, such as the methyl to ethyl to propyl to isopropyl to butyl isobutyl to sec.-butyl to amyl to hexyl to octyl to nonyl to decyl to dodecyl to hexadecyl to and octadecyl esters; cycloalkyl esters, such as cyclohexyl acrylate or methacrlate; aralkyl esters, such as benzyl acrylate, methacrylate or itaconate, or phenylethyl acrylate or itaconate; alkoxyalkyl or aryloxyalkyl esters, such as ethoxyethyl, octoxyethyl, phenoxyethyl, benzoxyethyl, ethoxyethoxyethyl, butoxyethoxyethyl, ethoxypropyl, butoxypropyl acrylates, methacrylates, or itaconates; vinyl carboxylates, including vinyl acetate, propionate, and thioacetate; alkyl maleates and fumarates, although the rate at which these copolymerize with other materials is too slow to permit a large proportion thereof entering into the polymeric structure. This is also true of allyl esters, such as allyl acetate, and of other allyl compounds, such as allyl ethyl ether, allylacetamide, methacrolein, allyl alcohol, or allylurea.

There is a considerable variety of vinyl ethers which can enter into copolymers, even though some of the ethers do not readily form homopolymers under the influence of free radical catalysts. Useful ethers include alkyl vinyl ethers, which have little water-solubility, such as butyl vinyl ether, or dodecyl vinyl ether, and other ethers, such as benzyl vinyl ether, ethoxypropyl vinyl ether, butoxyethyl vinyl ether, phenoxyethyl vinyl ether, ethyl vinyl thioether, or butyl vinyl thioether; substituted ethers, such as hydroxybutyl vinyl ether, hydroxypentyl vinyl ether, and other hydroxyalkyl vinyl ethers which are relatively insoluble in water and can thus be utilized in emulsion polymerization, ureidoalkyl vinyl ethers, including ureidoisobutyl vinyl ether, 5-ureidopentyl vinyl ether, etc.

Amides provide another interesting subclass of polymerizable compounds having the vinylidene group, $CH_2=C=$ (this includes the vinyl group, $CH_2=CH-$), typical of these being methacrylamide, N-alkylmethacrylamides, such as N-methylmethacrylamide, N-butylmethacrylamide, N-phenylmethacrylamide, or N,N-dimethylmethacrylamide, N-alkylacrylamides, such as N-methylacrylamide, N-butylacrylamide, N,N-dimethylacrylamide, N-phenyl-N-methylacrylamide, N-cyclohexylacrylamide, N-benzylacrylamide, also, in a limited use because of ready water-solubility, acrylamide, and similar itaconamides, and ther α-substituted acrylamides. Similarly, there may be used for forming polymeric dispersions N-hydroxymethyl derivatives of acrylamides having a hydrogen on the amide nitrogen and N-alkoxymethyl derivatives which can be formed by etherification of the hydroxymethyl group with a monohydric alcohol, such as methyl alcohol up to octyl alcohol. It should also be mentioned that hydroxylmethyl and alkoxymethyl groups can be introduced into copolymers formed from acrylamides having a hydrogen atom on the amido-nitrogen.

Reference has already been made to the use of acrylonitrile and α-methacrylonitrile. Other α-substituted acrylonitriles may likewise be used.

Hydrocarbons which can be introduced as one type of mer are those polymerizable with free radical catalysts, such as styrene and p-methylstyrene.

There may also be used to form copolymers useful in this invention various polymerizable substituted esters, amides, ketones and ethers, including such compounds as N-vinylacetamide, N-vinyl succinimide, vinyl caprolactam, vinyloxyalkylmelamines, vinyloxyalkylcyanamides, ureidoalkyl acrylates, ureidoalkyl methacrylates, isocyanatoalkyl, acrylates or methacrylates, ureidoalkylacrylamides, ureidoalkylmethacrylamides, isocyanatoalkylacrylamides, 1-methacrylamidoalkylimidazolidone-2, acrylamidoalkyl hexahydro-2-pyrimidone, acrylamidoalkylhexahydro-2- thiopyrimidone, N-vinyloxyalkylcarbamates, isocyanatoalkyl vinyl ethers, N,N-ethyleneureidoalkyl vinyl ethers, vinyloxyalkylimidazolidones, vinyloxyalkylhexahydropyrimidones, ureidoalkyl vinyl ethers, vinyl methyl ketone, vinylpyrrolidone, acrylamidoalkylureas, and similar compounds which supply both a polymerizable vinylidene group and a reactive functional group. In the case of ureido compounds, for example, formaldehyde can be reacted to form methylol compounds and to form alkoxymethyl derivatives. These also enter into copolymers. Similarly, copolymers made with ureido derivatives may be spun and then reacted to form methylol groups and alkoxymethyl groups. Where the monomers are water-soluble, only limited amounts can be introduced into copolymers formed by emulsion polymerization. But introduction into a copolymer of even as small a percentage as 1 to 5% of mers having reactive groups permits later reaction by which dimensional stability can be effected.

In the emulsion polymerization of monomers to give dispersions of polymeric products having the specified Tg values there may be used any of the conventional emulsifiers, anionic, cationic, or non-ionic, such as sodium dodecyl sulfate or sulfonate, sodium pentadecylbenzenesulfonate, sodium octylphenoxyethoxyethylsulfonate, octylphenoxypolyethoxyethanol, tetradecylthiopolyethoxyethanol, ethylene oxide condensates of tall oil and other long-chained fatty acids, lauryldimethylbenzylammonium chloride, dodecylbenzyltrimethylammonium chloride, or any of the many wetting agents and emulsifiers which are generally advocated for forming aqueous emulsions. Some emulsifiers are better for handling a given monomer or a mixture of monomers than others. But a few simple trials are needed to establish a good emulsifying system. In some cases, a mixture of agents is desirable. Amounts of emulsifying agent may vary from a few tenths percent to ten or more percent of the weight of monomer or monomers.

As polymerization initiator there may be used one or more of the peroxides or azo initiators, which act as free-radical catalysts and which are known to be effective between about 30° and 100° C., such as benzoyl peroxide, tert-butyl hydroperoxide, cumene hydroperoxide, tetralin peroxide, acetyl peroxide, caproyl peroxide, tert-butyl perbenzoate, or methyl ethyl ketone peroxide, or azodiisobutyronitrile, dimethyl azodiisobutyrate, etc. In aqueous systems ammonium, sodium, or potassium persulfate is generally most convenient, particularly when used in conjunction with a reducing agent, such as a sulfite, bisulfite, metabisulfite, or hydrosulfite, as of an alkali metal, to provide a redox system, which will start the polymerization reaction at a low or moderate temperature. Often the addition of a few parts per million of polyvalent metal, such as iron, accelerates the reaction. Monomer or mixture of monomers and/or catalyst may be added in small increments as the polymerization reaction proceeds. In this way, a dispersion is formed with a relatively high solids content. These dispersions do not have, however, a marked viscosity. Therein lies a real advantage for the present invention.

The relatively low viscosity of the aqueous dispersions permits passing them without the use of high pressures through an orifice into a coagulating bath. For this reason the orifice, jet, or spinnerette may be relatively light in construction and/or of material which could not be used with pressures formerly required in fiber-spinning from melts or viscous solutions, even though the latter may have a relatively low content of fiber-forming material.

The device for spinning may have but a single orifice or it may have multiple openings as in the conventional spinnerette used in rayon manufacture. The openings may be round, elliptical, or slotted. The jet is fed with dispersion, conveniently by a constant pressure or constant displacement method, as by an oil ram. Gear pumps are suitable only when the dispersions have a high degree of stability and resistance to mechanical shear.

The jet or spinnerette is placed in direct contact with the coagulating bath. As the dispersed resin passes thereinto it forms a continuous structure of more or less strength. The coagulating bath comprises an aqueous solution of electrolyte, the bath having a pH of at least 8. The most effective baths have a pH of at least 12 and an electrolyte content of 5% to 50%, preferably 10% to 40%. Water-soluble electrolyte, such as sodium chloride, lithium chloride, potassium chloride, sodium carbonate, sodium sulfate, sodium acetate, potassium sulfate, sodium or potassium formate, or sodium phosphates of various types including complex phosphates, alkalies such as sodium or potassium hydroxide, or mixtures of such electrolytes may be used. Alkalinity may also be supplied by a quaternary ammonium hydroxide such as trimethylbenzylammonium hydroxide, hydroxyethyltrimethylammonium hydroxide, or dimethyldibenzylammonium hydroxide. Organic materials such as glucose and urea may also be present in the bath. While under carefully controlled conditions and with certain dispersions, solutions of sodium chloride or ammonium chloride have been used for the formation of filamentous extrusions, alkalinity in the coagulating bath has been observed as almost essential for the practical and economical production of multifilaments or threads by the present process.

The composition of the coagulating bath depends in part upon the particular polymer or copolymer which is being coagulated into a shaped product. With copolymers having a relatively high $Tg$ value best results are obtained by using a relatively high content of alkali in the coagulating bath. This appears desirable also for copolymers in which the polar groups are less readily saponified or hydrolyzed. A few tests will demonstrate the most effective compositions and concentrations for the coagulating bath for a given dispersion. It may also be noted that in the lower range of solids contents in the dispersion, it is most desirable to use coagulating baths containing a high range of dissolved solids. Dispersions with high solids content can be effectively coagulated in baths with a wide range of concentrations of dissolved electrolytes.

The temperature of the coagulating bath is between 30° and 105° C. The particular temperature selected depends upon a number of factors. For resins having relatively higher $Tg$ values correspondingly higher bath temperatures should be used. As the total concentration of alkali and electrolyte is increased in the bath, the bath temperature may be lowered. In any case, the bath temperature must not be so high as to cause coagulation of resin behind the openings of the jet or spinnerette. This last factor is, of course, related to the design of the apparatus, the nature and temperature of the dispersion, and the rate of spinning. The jet or spinnerette may, for example, be jacketed and cooled. The face of the jet may be horizontal or vertical. Spinning can be successfully done vertically upwards or downwards or in a plane, which is in general horizontal or which is at an angle with the horizontal.

The immersion of freshly formed filament, thread, film, or other shaped products may be for a fraction of an inch or for several feet. The length of travel through the coagulating bath is not apparently a critical factor, but rather one which is related to bath concentration and temperature and rate of product formation. Coagulation occurs very rapidly and at or close to the face of the jet or spinnerette. Exposure of the product to the strongly alkaline baths causes hydration and some hydrolysis on the surface of the polymeric particles. This action is an integral part of the process. Hence, the exposure of shaped product to the coagulating bath should be sufficient to establish surface effects of this sort.

The rate of formation of filament, thread, or foil or other shaped product is usually from about 1 to about 25 meters per minute. It is necessary to spin at least at such a rate as will prevent coagulation within the opening of a jet. Higher rates depend on the resin used, the nature of the bath, and the design of the apparatus. The freshly formed product is drawn through the bath usually under slight tension.

It is usually the best practice to wash the shaped product at this point, although washing may alternatively be done at a later stage. Water or acidified water is generally used. The temperature of the water or other washing medium may conveniently be from 20° to 80° C. and is preferably 30° to 50° C. The process is expeditiously carried out by using acidified wash water to remove free alkali picked up from an alkaline coagulating bath. An acid wash may desirably be followed by a water wash to remove possible traces of acid, except where a liquid organic acid is used, when this acid may assist in the fluxing together of polymer particles. The acid wash may contain about 1% or more of a weak or strong acid. A particularly convenient acid wash solution contains 1% to 20% of acetic acid or of formic acid or any carboxylic acid which is water-soluble. Higher acid concentrations can be used up to the point where a solvent effect is observed, which may be sometimes advantageous. Dilute hydrochloric or sulfuric acid is economical. It is preferred that the acid used be a volatile one. In an advantageous system of operating there may be used a water wash, an acid wash, and another water wash. Washing may be done by immersion, with a stream, or by spraying, conveniently as the filament, thread, or foil passes over rollers or other thread-advancing devices.

The washed product is now dried and heated to a point at which coalescence of particles without actual melting takes place. As water leaves the shaped products with polar groups present in or on the surfaces, powerful surface tension forces come into play which tend to draw the particles together and cause a sort of fusion of particles without the necessity of melting. For this reason this step of the process is identified as fuse-drying.

In fuse-drying the temperature of the product must be above the $T_g$ value of the polymeric material and is usually carried to a relatively higher temperature. The polymeric material reaches a temperature as the free water leaves the shaped product which is above its $T_g$ but below the range of temperature at which chemical decomposition occurs. Usually a temperature at least 30° C. above the $T_g$ value is reached. While it is difficult to determine with certainty the actual temperature of filament, yarn, or film during fuse-drying, the temperature of the environment or space through which the originally wet filament, yarn, or film is passed can be fixed. This may vary from about 60° to 400° C., preferably 100° to 250° C., the optimum level being determined by the nature of the shaped object, the presence and nature of the washing solution, the type of apparatus and the rate of passage therethrough.

In a multifilament yarn some superficial joining of filaments may occur, but such joined filaments can be separated by slight mechanical working or by passing the yarn over an edge. It is rather remarkable that coalescence of particles within a filament can be thus promoted, even with environmental temperatures up to 400 C., without definite joining of individual filaments. Of course, filaments could be fused together, if so desired, by subjecting yarns to sufficiently high temperatures for the necessary period of time.

During this heating step, there may be some retraction in the yarn unless it is held under tension. This is not of consequence, for at some stage after the particles within the filaments have been joined, the filament, thread, yarn, or foil is subjected to a stretching operation. Some stretch may be applied, for example, during or even before fuse-drying.

Stretching after fuse-drying is carried out at a temperature from 80° to 250° C. for the filaments or foils. The temperature of the environment may, of course, be higher. The heated material is passed over Godet wheels or rollers with differential peripheral speeds to promote stretching of 50% to 200%. Usually stretching of 300% to 1000% is desired. Where very low deniers are wanted, the stretching may be greater. As the stretched product leaves the apparatus for stretching, it is normally cooled. When the $T_g$ value is above the temperature reached on cooling, the degree of stretching reached in the differential drawing is substantially retained.

Where further processing is to be employed, a definite cooling step is not necessary. The thread, filament, or film may be wound on a bobbin or spool or passed directly through the additional processing step or steps.

The filaments, threads, or yarns produced by only the above described procedural steps are useful in the preparation of various types of fabrics. For example, they are useful in the fabric base for elastic rubber coated sheet, in the construction of carpets, rugs, upholstery fabrics, and crepe goods. They are useful in fabrics where shrinkage is desired as in filter cloths or tightly woven materials used in rainwear. Filaments or threads may be cut and used in the construction of nonwoven fabrics and used as staples on woolen, worsted, or cotton systems and in mixed systems.

Filaments, threads, and foils may be treated with conventional textile processing aids and finishing preparations. They may also be treated chemically at the reactive groups thereof, at one or more stages of the process which has just been described.

In the preceding discussion of our method for forming filaments and films there have been described essential steps for forming shaped products from aqueous dispersions of polymeric products having the described physical and chemical properties. In addition to these steps, there may be used, as has been indicated, one or more steps in which the shaped product is treated so as to establish cross-linkages. As a result of chemical reaction either between reagents and the shaped products or of components within the shaped products, dimensional stability is imparted thereto. This permits without substantial change in shape or dimensions exposure of the products to increased temperatures or cleaning operations without deleterious results.

If the shaped product is to be reacted with an external reagent, there must be present on the filament or film chemically reactive groups at which combination with a polyfunctional reagent can take place without destruction of the shaped product or such loss of orientation or blocking of orientation that the product fails to hold or develop strength. Where the shaped product contains such reactive groups as epoxy groups, reaction can take place at relatively low temperatures and, therefore, without loss of orientation. Where there are such reactive groups as carboxyl or hydroxyl groups, a reagent of good reactivity should be used so that excessive temperatures may be avoided. There may also be similarly utilized in the polymers such reactive groups as amido groups, ester groups, carbamate groups, unsaturated azlactone groups, anhydride groups, methylene halide groups, acyl halide groups, amino groups having reactive hydrogen, isocyanate groups, and the like, a polyfunctional reagent with appropriately reactive substituents being selected to suit the reactive group of the shaped product.

The reagents used may thus depend upon such reactive groupings as isocyanato, isothiocyanato, amino, hydroxyl, sulfhydryl, amido, carboxy, epoxy, and aldehydo. Two or more reactive groups must be present in a given reagent to produce cross-linking. The reagent may be monomeric or polymeric. Usually it is desirable that it have several or more atoms separating the reactive functional groups. The reagents are peculiarly effective when reactive group or groups occur in side chains or branches, since this arrangement leads to a high degree of flexibility and adjustment of reagent to the active sites of the shaped products. It is important, of course, that the several reactive groups of a given molecule of reagent react at two or more sites of the product.

In the reaction of reagent and shaped product there are three stages at which the two may be brought together. The dispersed polymeric material may be spun or shaped with coagulation, fuse-dried, heat-stretched, and then treated with a reagent with subsequent drying and curing. Again, the polymeric material may be spun or shaped with coagulation, fuse-dried, treated with an external reagent, then heat-stretched and cured. In a third method the polymeric material is spun or shaped with coagulation, treated with external reagent, fuse-dried, heat-stretched, and cured.

When the shaped product is in a state of high molecular orientation, diffusion of reagent into the shaped product is apt to be slow. If a swelling agent or excess heat is used to increase rate of diffusion, the shaped product may lose much of its orientation. On the other hand, if substantial cross-linking occurs through reagent and shaped product being reacted at an early stage, orientatation may become difficult. Premature cross-linking may be delayed or inhibited by such means as rapid fuse-drying and/or heat-stretching, use of a volatile inhibitor (e. g. water in reactions involving condensation), a latent catalyst, an induction period, or a volatile inhibitor for controlling the catalyst where a catalyst is used to promote reaction of reagent and shaped product.

Where the reagent to be used is water-soluble, aqueous solutions of 1% to 70% of reagent are conveniently used for treating the shaped product. The concentration selected depends on the particular reagent, the nature of the reactive groups of the shaped product, and conditions of treatment. The treating solution may be used at 20° to 100° C. for times between a few minutes and some hours. Sometimes it is sufficient to pass the product through the solution; again, the product may be soaked in the solution; again, molten reagent may be used.

The solution may include a catalyst for promoting reaction with the shaped product. There may be used, for example, an ammonium salt, as ammonium chloride, thiocyanate, or phosphate, which promotes reaction of active hydrogens as in hydroxyl groups or ureido groups and such substances as polymethylol ureas, dimethylol ethylene urea, dimethylol ethylene thiourea, polymethylol melamines, dimethylol uron, dimethylol triazone, and the methyl ethers of these methylol compounds. Likewise, polymethylol derivatives of amides of polycarboxylic acids may be used. The amount of catalyst may be from 0.5% to 10% of the weight of the reagent used. There are, of course, other combinations of reactive groups than the above which benefit from use of a catalyst.

When solvent-soluble reagents are used, including reagents which are water-sensitive, the reagent may be dissolved in an organic solvent which does not attack or appreciably swell the shaped product or it may be applied directly, if it be a liquid. Hydrocarbons, such as naphtha, are generally useful to dilute reagents and aid in their application. There may also be used alcohols, or ethers, or other common solvents when these do not rapidly swell the shaped product. There may thus be applied such reagents as diisocyanates, including hexamethylene diisocyanate or diisothiocyanate, decamethylene diisocyanate, phenylene diisocyanate, propylene diisocyanate, butylidene diisocyanate, phenylene diisothiocyanate, triisocyanatobutane, triisocyanatobenzene, etc. Polycarboxylic acids, their anhydrides, or acid halides may likewise be so used where the shaped products carry functional groups reactive therewith, such substances as succinic acid, pimelic acid, azelaic acid, and sebacic acid and their derivatives being of interest here, as also citric, tricarballylic, and polyacrylic acids and derivatives.

Polyamines such as ethylenediamine, propylenediamine, diethylenetriamine, triethylenetetramine, tetraethylenepentamine, and other polyalkylenepolyamines, may be used in aqueous solution, solvent solution, or as such to treat products having groups reactive with amino groups. Reaction of polyamines with such groups as epoxy or carboxyl is readily accomplished.

Shaped products may also be treated with vapors of reagents which react with two or more functional groups of the shaped product. The lower boiling polyamines, such as ethylenediamine, can be used for this purpose. Formaldehyde also acts as a cross-linking agent, although it lacks the chain length and flexibility of the better reagents.

Use of an external reagent is not, however, essential as mutually reactive groups can be present or developed within a copolymer. For example, a copolymer may be made with ureido-substituents which, when heated, decompose to give isocyanate groups. These are reactive with many types of groups which can be present within a copolymer and which possess reactive hydrogen including ureido groups. Also, two or more aqueous dispersions of different kinds of polymeric products can be mixed, one kind containing a group reactive with a group of the other kind. Reaction between the two occurs only with sufficient temperature and time, thus permitting cross-linking to be completed after heat-stretching.

Additional details of the process of this invention are presented in the following illustrative examples, wherein parts are by weight, unless otherwise designated.

*Example 1*

An aqueous dispersion containing 40% of copolymer was prepared by emulsion polymerization with the aid of a non-ionic emulsifier. It contained particles of less than 0.1 micron of a copolymer having 60% by weight derived from methyl acrylate and 40% from acrylonitrile. This copolymer had a $T_g$ value of about 42° C. The dispersion was metered at the rate of 1.5 grams per minute through a spinnerette into a coagulating bath. The spinnerette consisted of a platinum alloy. It had a face diameter of 0.5 inch and contained 40 holes each of 0.0025 inch diameter. The coagulating bath was an aqueous 20% sodium hydroxide solution. It was maintained at 65° C. The bundle of filaments formed was drawn through the bath at the rate of about four meters per minute. The immersion path was 20 inches. The yarn was washed on a revolving wheel with a spray of water at 40° C. It was passed through an aqueous 10% acetic acid solution to neutralize any residual caustic. It was passed through an oven at 120° C. to dry the filaments and to promote coalescence of particles therein. It was then passed over rolls operating at differential speeds to stretch the yarn about 800%. During this operation the yarn was heated to about 120° C. It was cooled to about 35° C. to give a yarn which at 65% relative humidity and 72° F. had a breaking strength of 2.7 grams per denier and a breaking extensibility of 57%. It had a denier of 149.

*Example 2*

A copolymer was prepared in aqueous dispersion with an anionic emulsifier to contain 75% of acrylonitrile and 25% of ethyl acrylate by weight. The copolymer comprised 25% of the dispersion. It was forced under constant air pressure through a glass capillary of 0.009 inch diameter into an aqueous 20% ammonium chloride solution at 85° C. The filament which formed was washed with water, passed through an oven at about 250° C., and passed over rollers operating at differential rates to stretch the filament about 500%. The final filament was somewhat brittle and of only moderate strength.

*Example 3*

An aqueous anionic dispersion of the same composition as used in Example 2 was forced under constant pressure through a glass capillary of 0.009 inch diameter into an aqueous 30% sodium hydroxide solution at 90° C. The resulting single filament was passed through an aqueous 50% acetic solution, washed with water, passed through an oven at 200° C., heat-stretched about 500% at about 250° C. and cooled to about 35° C. The resulting filament of 16 denier had, at 65% relative humidity and 72° F., a tensile strength of one gram per denier and a breaking extensibility of 30%.

*Example 4*

An aqueous dispersion was prepared by emulsion polymerization with the aid of a non-ionic emulsifier. It contained particles less than about 0.1 micron in diameter of a copolymer derived from 90% of methyl methacrylate and 10% of ethyl acrylate by weight and had a 40% content of this copolymer. The dispersion was forced under constant pressure through a glass capillary of 0.009 inch diameter into an aqueous 30% sodium hydroxide solution at 105° C. The resulting filament was passed through a bath containing 50% acetic acid and washed with water. It was passed through an oven at about 200° C., heat-stretched at about 150%, and cooled to about 40° C. in air. The resulting filament had a tensile strength of 2 grams per denier and a breaking extensibility of 28% at 65% relative humidity and 72° F. The filament had a denier of 21.

*Example 5*

An aqueous non-ionic dispersion of 40% of a copolymer from 40% of acrylonitrile, 55% of ethyl acrylate, and 5% of 5-hydroxypentyl vinyl ether was passed at a constant rate of 1.1 grams per minute through a 40-hole spinnerette, each opening of which was 0.005 inch in diameter, into a coagulating bath at 75° C. containing 10% of sodium carbonate and 15% of sodium hydroxide. The rate of travel of yarn through the bath was about 3.36 meters per minute. The yarn was washed with water, passed through an oven at about 200° C., heat-stretched about 500% at about 200° C. and cooled. The resulting yarn was of 195 denier. It had a tensile strength of 1.3 grams per denier and a breaking extensibility of 35%.

The above 5-hydroxypentyl vinyl ether is prepared from 1,5-pentanediol by reacting it with acetylene just as has been done with ethylene, propylene, and butylene glycols by the method of Reppe 1,959,927.

*Example 6*

A copolymer was prepared by emulsion polymerization from 50 parts of acrylonitrile, 45 parts of ethyl acrylate, and 5 parts of 5-hydroxypentyl vinyl ether with the aid of a non-ionic emulsifier. The solids content of the resulting dispersion was adjusted to 40%. This aqueous dispersion was passed under pressure at a constant rate of feed of 1.6 grams per minute through a spinnerette having 40 holes each of 0.0025 inch diameter into a coagulating bath at 75° C. of aqueous 20% caustic soda solution. The rate of passage through this bath was 3.36 meters per minute. The distance of immersion was 40 cm. The yarn was washed as it passed over a roller, passed through a spray of aqueous 5% acetic acid solution, and washed again with water. The yarn was passed through an oven at 200° C. and was heat-stretched about 850% at about 225° C. The yarn then had a denier of 180, a tensile strength of 1.3 grams per denier, and an extensibility at break of 30%.

*Example 7*

The dispersion described in Example 6 was passed through the same kind of spinnerette at the rate of 1.4 grams per minute into a coagulating bath at 70° C. containing 15% of urea and 10% of sodium hydroxide in water. The yarn, formed at about 3.2 meters per minute, was drawn from the bath on rollers, on which it was washed with water and with 5% acetic acid solution. The washed yarn was dried and heated in an oven at about 200° C. and heat-stretched about 900% at about 225° C. It was then allowed to cool to room temperature and wound on a bobbin. The yarn had a denier of 158, a breaking strength of 2.9 grams per denier, and an extensibility of 27%.

*Example 8*

An aqueous dispersion comparable to that in the two previous examples, but derived from acrylonitrile 60%, ethyl acrylate 35%, and 5-hydroxypentyl vinyl ether 5%, was passed through the same type of 40-hole spinnerette into a coagulating bath at 75° consisting of aqueous 20% sodium hydroxide solution. The yarn was drawn from this bath on rollers, upon which it was washed with 5% acetic acid solution and with water. It was dried and heated without tension in an oven at 200° C. and then heat-stretched about 1700% at 250° C. The resulting yarn had a denier of 86, a tensile strength of two grams per denier, and an extensibility of 18%.

*Example 9*

A copolymer was prepared in aqueous dispersion from 50 parts of acrylonitrile, 40 parts of ethyl acrylate, and 10 parts of ureidoisobutyl vinyl ether with the aid of a non-ionic emulsifier. The dispersion contained 41% of the copolymer, having a $Tg$ value of about 50° C. It was passed at the rate of 1.0 gram per minute through a spinnerette having 40 openings of 0.0025 inch each into an aqueous 20% potassium hydroxide bath at 75° C., filaments forming at the rate of about 1.4 meters per minute, was washed with water, passed downwards through a tower heated at 225° C. and heat-stretched about 610% at about 250° C. The resulting yarn had a denier of 350, a tensile strength of 1.9 grams per denier, and an extensibility of 20%.

*Example 10*

A copolymer of 45% acrylonitrile, 45% ethylacrylate, and 10% ureidoisobutyl vinyl ether at 40% solids in an aqueous anionic dispersion was passed at a rate of 0.6 gram per minute through the above type of 40-hole spinnerette into an aqueous 20% sodium hydroxide solution at about 75° C. The yarn was washed with water, passed through an aqueous 10% acetic acid solution, and dried with coalescence of particles at about 200° C. It was heat-stretched about 400% and thus reduced to 100 denier. It had a tensile strength of 2.4 grams per denier and an extensibility of 28%, both measurements being taken, as usual here, at 65% relative humidity and 72° F.

*Example 11*

An aqueous non-ionic dispersion containing 40% of copolymer from 45 parts of acrylonitrile and 55 parts of methyl acrylate was passed at 1.5 grams per minute through a 40-hole spinnerette, each hole of which had a diameter of 0.0025 inch, into an aqueous 20% sodium hydroxide solution at 65° C. The resulting yarn was drawn from this bath on a roller, upon which it was sprayed with water. It was passed through an oven at 200° C. and heat-stretched at 250° C. to give a denier of 120. This yarn had a tensile strength of 2.2 grams per denier and an extensibility of 26%.

*Example 12*

Yarn was made from a non-ionic dispersion of a copolymer from 50% of acrylonitrile and 50% of methyl acrylate at 40% solids under the conditions recited in Example 11. The heat-stretched fiber had a denier of 130, a tensile strength of 3.0 grams per denier, and an extensibility of 29%.

*Example 13*

There were mixed 45 parts by weight of ethyl acrylate, 50 parts of acrylonitrile, and 5 parts of N-methyl vinoxyethylmelamine. This mixture was stirred into 200 parts of an aqueous solution containing 5 parts of an octylphenoxypolyethoxyethanol as emulsifier. Thereto were added 2 parts of ammonium persulfate dissolved in about 6 parts of water, followed by one part of sodium hydrosulfite in 10 parts of water. The mixture was stirred with polymerization starting and carrying the temperature to about 65° C. The resulting dispersion was cooled to 30° C. and passed through a spinnerette having 40 holes each of 0.0025 in. diameter and into a coagulating bath consisting of an aqueous 20% sodium hydroxide solution at 70° C., filaments forming at the rate of about one meter per minute. The resulting yarn was drawn through about 10 inches of bath, passed over a roller where it was sprayed with water and over another roller where it was sprayed with 10% acetic acid solution. The yarn was then dried by downward passage through a tower heated at 200° C. The dried yarn was passed over differential rollers where it was stretched about 900% in an environment at about 250° C. and was then cooled to 30° C. The resulting yarn had a denier of about 150, a tensile strength of 2 grams per denier, and an extensibility of 40%.

*Example 14*

In the same way as in Example 13 an aqueous dispersion of copolymer was prepared from 50 parts of ethyl acrylate, 45 parts of acrylonitrile, and 5 parts of N-(α-methacrylamidopropyl)-hexahydro-2-pyrimodone was prepared at about 40% copolymer solids. This was passed at a rate of about 1.4 grams per minute through a 40-hole spinnerette, each hole being 0.0025 inch in diameter, into an aqueous solution containing 10% of sodium hydroxide and 15% of urea at 70° C. Filaments were formed at the rate of 2.7 meters per minute, drawn through the coagulating bath, passed through water and through a 10% acetic acid solution, and heated in a tower at 200° C. to dry the filaments and cause coalescence of particles. The filaments were then heated at 200° C. and stretched 1150 percent. They were cooled to about 25° in air and wound on a bobbin. This product had a denier of 150, a tensile strength of 1.7 grams per denier, and an extensibility of 25%.

*Example 15*

The procedure of the previous example was followed, starting with a mixture of 50 parts of ethyl acrylate, 45 parts of acrylonitrile, and 5 parts of N-methyl vinoxyethylmelamine. The non-ionic dispersion of copolymer therefrom was passed at the rate of one gram per minute through the same kind of spinnerette into an aqueous 20% sodium hydroxide solution at 70° C. Washing, drying, and stretching 400% were carried out as before. The resulting yarns had a denier of 275, a tensile strength of 1.7 grams per denier, and an extensibility of 50%.

*Example 16*

In the same way a non-ionic dispersion was prepared of a copolymer from 60 parts of acrylonitrile and 40 parts of butoxyethyl acrylate. The dispersion had a copolymer content of 39%. It was passed at the rate of 1.5 grams per minute through a 40-hole spinnerette as before into a coagulating bath which was a solution containing 30% of sodium hydroxide. This bath was maintained at 65° C. Washing, drying, and stretching steps were carried out as above with stretching being adjusted to 900%. The cooled filament had a denier of 204, a tensile strength of 1.5 grams per denier, and an extensibility of 30%.

*Example 17*

In the same general way a copolymer was prepared from 31 parts of ethyl acrylate, 64 parts of methyl methacrylate and 5 parts of 2-hydroxyethyl vinyl sulfide in a non-ionic dispersion with a solids content of about 40% for the dispersion. This was passed through a 40-hole spinnerette at one gram per minute into an aqueous 30% sodium hydroxide solution at 70° C. with formation of filament at the rate of 6 meters per minute. The filament was washed, dried, and stretched 220%. The resulting filament had a denier of 188, a tensile strength of 0.8 gram per denier, and an extensibility of 15%.

*Example 18*

Another copolymer was prepared from 16 parts of ethyl acrylate, 64 parts of methyl methacrylate, 10 parts of omega hydroxypentyl vinyl ether, and 10 parts of aminoisobutyl vinyl ether in a non-ionic dispersion at about 40% solids. This dispersion was passed at one gram per minute through the 40-hole spinnerette into an aqueous 30% sodium hydroxide solution at 70° C. through which the resulting yarn traveled at 3.5 meters per minute for a distance of 20 cm. The yarn was washed with a water spray, passed through a bath of 10% acetic acid, and passed through a tower heated at 220° C. It was then stretched 174% with an environment at 200° C. and cooled to 30° C. This yarn had a tensile strength of 0.7 gram per denier, an extensibility of 5%, and a denier of 376.

*Example 19*

A copolymer in a non-ionic 40% dispersion was prepared as above from 21 parts of ethyl acrylate, 64 parts of methyl methacrylate, 10 parts of omega-hydroxypentyl vinyl ether, and 5 parts of β-aminoethyl vinyl ether. It was passed through the 40-hole spinnerette at 0.8 gram per minute and the resulting filaments passed through 20 cm. of an aqueous 30% sodium hydroxide solution at 70° C. at the rate of 4 meters per minute. The filaments were washed with water, 20% acetic acid, and water, were heated in a tower at 200° C., stretched 96% at about 200° C., and cooled to about 35° C. This yarn gave a tensile strength of 0.8 gram per denier and an extensibility of 50%. It had a denier of 368.

*Example 20*

A 40% dispersion was prepared from a mixture of 55 parts of ethyl acrylate and 45 parts of acrylonitrile, emulsion polymerization being effected in the presence of an aqueous 3% solution of dodecylbenzyl trimethyl ammonium chloride, a cation-active emulsified, with the aid of a redox system of ammonium persulfate and sodium hydrosulfite supplemented with about 0.1% of benzoyl peroxide. The dispersion was fed at one gram per minute through the 40-hole spinnerette into a 30% caustic soda solution at 70° C., the filament being formed at 4 meters per minute. Washing with water and dilute acetic acid followed by fuse-drying in a tower at 200° C. was effected as above. The yarn was heat-stretched 456% in an environment at 250° C. The product had a denier of 162, a tensile strength of 1.3 grams per denier, and an extensibility of 35%.

*Example 21*

A non-ionic dispersion was prepared through emulsion polymerization of a mixture consisting of 45% ethyl acrylate, 45% acrylonitrile, and 10% ureidoisobutyl vinyl ether with the aid of an alkylcresoxypolyethoxyethanol as emulsifying agent and ammonium persulfate, benzoyl peroxide, and sodium hydrosulfite in the redox system. The dispersion was adjusted to a 40% solids content and metered at the rate of 1.0 gram per minute through a spinnerette of 0.5 inch face diameter having 40 holes of 0.0025 inch diameter into an aqueous 20% sodium hydroxide solution at 75° C. The resulting bundle of filaments was drawn through 44 inches of bath, washed with water at 40° C. on a roller, passed through an aqueous 10% acetic acid solution, fuse-dried at 120° C., and heat-stretched. There was formed a yarn of 200 denier.

Part of this yarn was wound on a bobbin which was soaked for 30 minutes at 40° C. in an aqueous solution containing 10% of the dimethylol derivative of ethyleneurea. The soaked yarn was air-dried and heated at 45° C. for 12 hours while it was held at constant length.

This yarn was examined for shrinkage after being heated without tension at 80° C. for four hours. It shrank 3.6%. A sample of yarn taken before the soaking step exhibited a shrinkage under the same conditions of 76.2%.

Another part of the above yarn was soaked for 30 minutes in the same way in an aqueous solution containing 5% by weight of bis(methoxymethyl)ethyleneurea. The soaked yarn was air-dried and heated at 45°–50° C. for 12 hours. Tests of samples of this yarn showed 8.8% shrinkage.

*Example 22*

A non-ionic dispersion was prepared with a redox catalyst from a mixture of 45 parts of ethyl acrylate, 45 parts of acrylonitrile, and 10 parts of glycidyl methacrylate. The dispersion had a copolymer content of about 40%. It was passed through a 40-hole platinum alloy spinnerette with holes of 0.0025 inch diameter into an aqueous 30% sodium hydroxide solution at 80° C. The bundle of filaments was drawn through 30 inches of this solution, washed with water at 40° C., passed through aqueous 10% acetic acid solution, fuse-dried in a 48 inch tower heated at 250° C., and stretched at 150° C. about 200%. The resulting yarn had a denier of 200.

A portion of this yarn was soaked while relaxed in an aqueous 20% solution of polyethylenepolyamines having an average molecular weight of about 1000 for 90 hours at 25° C. The soaked yarn was air-dried, heated at 80° C. for an hour, heated at 130° C. for an hour, thoroughly washed in aqueous 5% acetic acid solution at 25° C., washed with water, and air dried.

The treated and untreated yarn was examined for shrinkage after being heated at 80° C. as above. The untreated yarn shrank 50%, while the treated yarn shrank 1%.

Another portion of the above yarn was treated with an aqueous 5% ethylenediamine solution at about 30° C. It was dried and washed as above. It shrank 3.5%.

Yet another portion of the above was treated by the same procedure with use of aqueous 5% hexamethylenediamine solution. Shrinkage was 1.7%.

Another portion of the above yarn was treated with an aqueous 5% diethylenetriamine solution as above. There was no shrinkage measurable in the processed yarn.

Example 23

The procedure of Example 22 was followed starting with a dispersion containing 40% of a copolymer from a mixture of 35 parts of methyl acrylate, 45 parts of acrylonitrile, and 20 parts of glycidyl methacrylate to give a multifilament yarn of 200 denier. One portion of this was soaked at constant length in an aqueous 5% ethylenediamine solution at 25° C. for 16 hours, dried, heated, first at 80° C. for an hour and then at 130° C. for an hour, soaked in aqueous 5% acetic acid solution, washed with water and dried. The treated yarn gave a shrinkage when heated at 80° C. under relaxed conditions of 2.1%, while untreated yarn shrank 50%.

The processing was repeated with hexamethylenediamine. The shrinkage was then 0%. This was also found for another portion of the yarn heated in the same way with diethylenetriamine.

Tensile strength of the above yarns was about two grams per denier with breaking extensibilities of 30%–40%.

Example 24

A non-ionic dispersion containing 40% of a copolymer of 45% acrylonitrile, 35% ethylacrylate, and 20% glycidyl methacrylate was pumped at 0.8 g. per minute through a 40-hole spinnerette with openings of 0.0025 inch each into an aqueous 30% sodium hydroxide solution at 75° C. The rate of draw was 2.8 meters per minute. The yarn was washed with water, passed through aqueous 20% acetic acid solution at 25° C., and fuse-dried at 100° C. It was then soaked in an aqueous 10% hexamethylenediamine solution at 20° C. for about 20 seconds, dried at 70° C., heat-stretched 240% at 120° C. and cured at 70° C. at constant length for 48 hours. The yarn had a tensile strength of 1.8 g. per denier and an extensibility of 43%. Shrinkage at 100° C. in relaxed state was 25%. Yarn made without the treatment with the diamine had a shrinkage at 100° C. of 70%.

Example 25

A non-ionic 40% dispersion of a copolymer of 30% acrylonitrile, 50% methylacrylate, and 20% glycidyl methacrylate was pumped at 2 grams per minute through the same 40-hole spinnerette into aqueous 30% sodium hydroxide solution at 80° C. The rate of draw from the jet was 2.8 meters per minute. The yarn was washed with water, passed through aqueous 4% acetic acid solution at 25° C., soaked in aqueous 5% hexamethylenediamine solution at 65° C. for 40 seconds, fuse-dried at 100° C. for 45 seconds, heat-stretched 540% at 140° C., and cured at constant length for 48 hours at 70° C. The resulting yarn had a tensile strength of 2.0 grams per denier and an extensibility of 40%. Relaxed shrinkage at 100° C. was 16% (control 70%) with a tensile strength of 1.0 g. per denier.

Example 26

A dispersion of copolymer of 70% vinyl acetate and 30% ethyl methacrylate was made with an anionic emulsifier with a conventional redox system. The solids content was 35%. The copolymer had a second order transition temperature, $T_g$, of 40° C.

It was forced at constant volume at the rate of 0.4 gram per minute through the 40-hole spinnerette with openings of 0.0025 inch into an aqueous 30% sodium hydroxide solution at 75° C. The rate of draw from the jet was 2.8 meters per minute. The length of travel through the coagulating bath was about 18 inches. The yarn was water-washed at about 40° C., passed through aqueous 4% acetic acid solution, fuse-dried at 70° C., and heat-stretched 275% at 110° C. The yarn was of 120 denier and had a tensile strength of one gram per denier and an extensibility of about 40%.

Example 27

A non-ionic emulsion containing 45 parts of ethyl acrylate, 45 parts of acrylonitrile, and 10 parts of ureidoisobutyl vinyl ether was treated with ammonium persulfate and sodium hydrosulfite with formation of a dispersion of copolymer at 45% solids. This was passed through a 40-hole spinnerette with 0.0025 inch openings into an aqueous 20% sodium hydroxide solution at 75° C. at a rate of draw of about six meters per minute. The yarn was well washed with water, soaked for a few seconds in aqueous 5% acetic acid solution at 25° C., and passed through a tower at 200° C., where it was fuse-dried. The dry yarn was stretched about 350% at 170° C. and heated at 170° C. for 10 minutes under a 10 gram tension. During the heat-curing some decomposition of ureido groups to isocyanate groups is believed to occur. The latter react with ureido groups to give cross-linking within the fiber. The resulting yarn had a denier of 130, a tensile strength of 1.2 grams per denier, and a breaking extensibility of 55%. A length of this yarn was heated at 100° C. without tension. It shrank 8.9%. A length of yarn taken after heat-stretching and before the curing step was heated at 100° C. also without tension. It shrank over 70%.

Example 28

Two separate non-ionic dispersions of copolymers at 40% solids were prepared. One was made from 55 parts of acrylonitrile, 35 parts of ethyl acrylate, and 10 parts of 2-aminoethyl vinyl ether. The other was made from 35 parts of acrylonitrile, 45 parts of methyl acrylate, and 20 parts of glycidyl methacrylate. Equal weights of the two dispersions were thoroughly mixed. The mixture was pumped at two grams per minute through a 40-hole spinnerette having holes of 0.005 inch diameter into a bath of aqueous 22% sodium hydroxide solution at 70° C. with a rate of draw from the jet of two meters per minute. The yarn was washed with water, soaked in aqueous 5% acetic acid solution at 25° C. for about two seconds, fuse-dried at 200° C. and heat-stretched 200% at about 150° C. A portion of yarn was taken at this point as a control. Another portion of the yarn was heated at 80° C. for 20 hours under a tension of 10 grams and then at 110° C. for 16 hours under the same tension. The thus treated yarn had a shrinkage when heated without tension of 14%. The control had a shrinkage of over 70%. This example illustrates how different groups can be utilized by mixing separately formed dispersions each of which contains a reactive group and reacting a group from one dispersion with a group in the copolymer of the second dispersion.

*Example 29*

A non-ionic dispersion was prepared from a mixture of 40% of acrylonitrile, 40% of ethyl acrylate, and 20% of glycidyl methacrylate. The dispersion was adjusted to a solids content of 40%. It was forced by an oil ram at the rate of 0.7 gram per minute through a spinnerette having 40 holes each of 0.005 inch diameter into a spinning bath of aqueous 30% sodium hydroxide solution at 70° C. Yarn formed and was drawn through about 12 inches of bath at the rate of three meters per minute. The yarn was passed through a water bath, an aqueous 40% acetic acid solution at 25° C., and then into an aqueous 2% sulfuric acid solution at 70° C., wherein the yarn remained for about two minutes and was stretched 550%. The yarn was then fuse-dried at 130° C. by passage through a heated tower and cured at 130° C. at constant length for 25 minutes. This yarn when heated at 100° C. retracted only 16%, whereas yarn spun in the same way but not treated with sulfuric acid retracts over 70%. The tensile strength of the retracted yarn was over one gram per denier with a breaking extensibility of 30%.

It seems evident that the sulfuric acid catalyzes a reaction involving the glycidyl group and other reactive groups within the yarn to cause cross-linking. The same effect is obtained by replacing sulfuric acid with other strong acids, such as hydrochloric and oxalic acids.

*Example 30*

A mixture was prepared from 45 parts by weight of acrylonitrile, 50 parts of ethyl acrylate, and 5 parts of hydroxypentyl vinyl ether. A solution was prepared from 100 parts of water and six parts of octadecyloxypolyethoxyethanol having about 19 ether groups. The mixture was stirred into the solution at 20° C. Thereto were added one part of triethanolamine, 0.3 part of ammonium persulfate, and 0.06 part of sodium hydrosulfite. Polymerization soon began. Good cooling was supplied and the temperature of the polymerizing mixture held at about 55° C. About 50 parts of water containing one-half part of octylphenoxypolyethoxyethanol with about 10 ether groups was stirred into the dispersion to bring the solids content to about 40%.

This dispersion was passed at a rate of 2.4 grams per minute through a 40-hole spinnerette having openings of 0.0025 inch diameter into an aqueous 20% sodium hydroxide solution at 70° C. The rate of draw from the jet was three meters per minute. The yarn was washed with water and with aqueous 10% acetic acid solution. It was fuse-dried at 120° C. and subjected to stretching of 1070% at 150° C. The stretched yarn was soaked for seven minutes in a benzene solution at 25° C. containing 10% of p,p'-diisocyanatodiphenylmethane and 1% of benzyldimethylamine. The yarn was then maintained at constant length for 85 hours at 70° C.

When a sample of this yarn was heated at 100° C. without tension, it shrank about 20%. The tensile strength of the retracted yarn was 0.9 gram per denier with an extensibility of 80%.

*Example 31*

The dispersion prepared in the previous example was pumped at 1.4 grams per minute through a spinnerette having 40 holes of 0.005 inch diameter into a spinning bath at 65° C. containing 30% of sodium hydroxide in water. The rate of draw from the spinnerette was 2.8 meters per minute. The yarn was washed with aqueous 4% acetic acid solution at 25° C. and fuse-dried at 130° C. The dry yarn was subjected to stretching at 150° C., 850% stretching being accomplished. The stretched yarn was passed through melted p,p'-diisocyanatodiphenylmethane at 40° C.; as some shrinkage occurred in this operation, the treated yarn was restretched to approximately its previous denier. It was cured at 70° C. at constant length for 48 hours.

The resulting yarn had a shrinkage of only 8.9% when heated without tension at 100° C. A control yarn shrank over 70%. The tensile strength of the retracted yarn was about one gram per denier with a breaking extensibility of 40%.

*Example 32*

The dispersion prepared in Example 30 was forced at a rate of 1.4 grams per minute through the 40-hole spinnerette having openings of 0.005 inch diameter into an aqueous 30% sodium hydroxide solution at 70° C. The yarn formed was drawn from the spinnerette at about 2.8 meters per minute. The yarn was washed with aqueous 4% acetic acid solution at 25° C., fuse-dried at 130° C., and soaked for about three seconds in molten p,p'-diisocyanatodiphenylmethane containing 1% of benzyldimethylamine. The yarn was heat-stretched and heated at 70° C. for 48 hours with 5% shrinkage. A sample of the resulting yarn was heated without tension at 100° C. with 17% shrinkage. A control gave over 70% shrinkage under the same conditions. The retracted yarn had a tensile strength of one gram per denier and a breaking extensibility of 55%.

*Example 33*

Two separate dispersions were prepared by essentially the same method as shown above—one from 45% of acrylonitrile, 50% of ethel acrylate, and 5% of methacrylic acid, and the other from 40% of acrylonitrile, 40% of ethyl acrylate, and 20% of glycidyl methacrylate. Each dispersion was adjusted to 40% solids content and the two were mixed in equal weights. The mixed dispersion was passed at the rate of 1.4 grams per minute through a spinnerette having 40 holes of 0.005 inch diameter into an aqueous 30% sodium hydroxide solution at 70° C. The rate of draw was three meters per minute. The yarn was drawn from the alkaline spinning bath, washed with water, washed with aqueous 4% acetic acid solution, soaked in aqueous 5% pyridine solution, at 25° C. for two minutes, fuse-dried, at 110° C., and heat-stretched at 100° C. about 500%. The yarn was then heated at 70° C. for 18 hours at constant length. The thus-treated yarn shrank 40% after being heated without tension at 100° C. It had a tensile strength of 0.9 gram per denier and an extensibility of 60%.

*Example 34*

A non-ionic emulsifier was used in the copolymerization of a mixture of 40 parts of acrylonitrile, 45 parts of ethyl acrylate, and 15 parts of ureidoisobutyl vinyl ether by emulsion technique with a redox catalyst system. The dispersion was adjusted to a polymer solids content of about 42%. It was forced at the rate of 1.4 grams per minute through a 40-hole spinnerette having holes of 0.005 inch diameter into an aqueous solution at 70° C. containing 5% of sodium chloride and 25% of sodium hydroxide. The rate of draw from the spinnerette was six meters per minute and the yarn was immersed in the alkaline bath for about 15 inches. The yarn was washed with aqueous 4% acetic acid solution at 25° C. It was then passed for 15 seconds through a bath at 70° C. containing 5% of formaldehyde and 2% of ammonium chloride dissolved in water. During passage through this bath the yarn was stretched 700%. It was then fuse-dried at constant length at 135° C. for 12 minutes.

When a sample of this yarn was heated without tension at 180° C., it shrank 25%. A control piece of yarn which was not treated with formaldehyde and catalyst shrank over 70%. The yarn had a denier of 106, a tensile strength of 0.9 gram per denier, and an extensibility of 100%.

This example illustrates increased reaction rate by carrying out the cross-linking at the same time as de-swelling (drying) of the polymeric material. Cross-linking efficiency is curtailed by orientation of primary chains which restricts molecular mobility. During de-swelling, as carried out above, molecular mobility may be increased, since molecules may move laterally by one another with no decrease in axial orientation, thus bringing reactive groups, in this case ureidoisobutyl groups, progressively into mutual proximity with cross-linking molecules (i. e., formaldehyde). Reaction involving two ureidoisobutyl groups and one formaldehyde molecule can occur when a nearly optimum spacial configuration is attained.

The above example also illustrates a variation in the process of this invention wherein a major portion of stretching is accomplished before fuse-drying.

Example 35

A dispersion of a copolymer formed from 45 parts of acrylonitrile, 50 parts of ethyl acrylate, and 5 parts of an alkylphenoxypolyethoxyethanol as emulsifier and a redox initiator system was adjusted to about 40% polymer solids, the 40% dispersion being passed through a spinnerette having 40 holes each of 0.005 inch diameter into a spinning bath at 67° C. of aqueous 30% sodium hydroxide solution. The feed rate was 1.4 grams per minute and the rate of draw from the spinnerette was four meters per minute. The yarn was drawn through and from this bath and drawn through a bath of aqueous 4% acetic acid solution. It was drawn through a tower heated at 130° C. and stretched at about 130° C. to give a stretch of 530%. This yarn had a denier of 200 and had a tensile strength of 2.0 grams per denier and a breaking extensibility of about 40%.

Example 36

The procedure of Example 35 was followed with a non-ionic dispersion of 40% copolymer formed from 45 parts of acrylonitrile, 50 parts of ethyl acrylate and 5 parts of 5-formamidopentyl vinyl ether. Rate of draw from the spinnerette, however, was five meters per minute and the stretch was 570%. The yarn had a denier of 150, a breaking strength of about two grams per denier, and an extensibility of about 35%.

Example 37

The procedure of the two previous examples was followed with a non-ionic dispersion containing 40% of a copolymer from 40 parts of acrylonitrile, 55 parts of ethyl acrylate, and 5 parts of ureidopentyl vinyl ether. Rate of draw was three meters per minute and stretch was about 740%. The final yarn had a denier of about 200, a tensile strength of about 2.5 grams per denier, and a breaking extensibility of about 40%.

The above examples demonstrate variations in the process of preparing strong, self-supporting fibers, filaments, yarns, and films from aqueous dispersions of particles of thermoplastic vinylidene polymeric materials which have apparent second order transition temperatures between about 25° and about 100° C., the particles being dispersed with emulsifying agents in stable aqueous dispersions at particle sizes below two microns. The essential steps comprise passing a defined dispersion through a shaping orifice into a coagulating bath having the pH values and electrolyte concentrations described above to form a shaped product, washing it, heating it to dry it and to coalesce particles therein, and stretching it with heating under tension.

While the products thus prepared find many applications, they can be improved in many respects and adapted for many additional applications by chemical linking of groups of the polymeric materials. As has been explained, chemically reactive groups are used in the polymer of the dispersions. After a shaped product has been formed, these groups can be reacted with a chemical reagent which is polyfunctionally and complementally reactive therewith. These terms are used to define two essential conditions.

The external reagent must react polyfunctionally, i. e., with at least two of the chemically reactive centers of the polymer in order to produce the desired linking. Hence, the reagent must have two or more reactive groups, or it must react at a single group thereof with at least two reactive centers of the polymer. This latter situation is best illustrated with formaldehyde or other reactive aldehyde which can react to join two chemically reactive groups of the polymer.

The expression complementally reactive is used to set forth the fact that the functional groups must be capable of reacting with the particular chemically reactive groups of the polymer. For instance, if the polymer contains amine groups having hydrogen on the nitrogen available for reaction, then the external reagent may contain a plurality of isocyanate or isothiocyanate groups, or of other groups reactive with such amine groups.

But an external reagent is not essential. Complementally reactive groups may be built into a given polymer or copolymer. Reaction between such groups can be promoted through heating with or without a catalyst. This situation has been illustrated with a copolymer containing epoxy groups and reactive amine groups, the two kinds of groups reacting when the shaped product is cured by heating. The situation is also illustrated by the behavior of ureido groups. A variation of this situation is encountered when the complementally reactive groups are supplied by mixing two dispersions, each of which contains one complementally reactive group.

Typical groups which may be used in the polymeric material or in the external reagent include carboxy, carboalkoxy, carboxylate, carbamyl, N-substituted carbamyl, ureido, acyl halide groups, carboxylic anhydride groups, formyl, halomethyl, hydroxy, mercapto, epoxy, amino, imino, isocyanato, isothiocyano, and other groups. As has been pointed out, one type of reactive group is used to react with another group which is complementally reactive therewith, suitable combinations being selected whether within a polymer or a mixture of polymers or for polymer and reagent.

The cross-linking of polymers in filaments or films, in conjunction with orientation, provides a means of stabilizing and strengthening them without resort to development of crystallinity or crystalline regions which have heretofore been relied upon for the development of strength in synthetic fibers.

The filaments and films prepared according to this invention exhibit orientation without being crystalline. They lack the sharp transition temperature of true crystals, their constant interfacial angles, and their rationality of intercepts. Fibers obtained from linear superpolymers on the other hand possess marked crystallinity. They are limited in composition to those materials which are conducive to the formation of crystalline regions. Often the compositions which are most suitable with respect to good dyeing properties, desirable handle, abrasion resistance, moisture absorption, and economy are not those suitable for the formation of crystallites. Crystallinity is achieved only with sacrifice of a large portion of the groups which would otherwise be available as sites for dye or water attachment and of amorphous areas which would contribute to high extensibility, abrasion resistance, and other desirable properties. Use of crystalline fibers must be below the melting point of the crystallites. Sparks or hot cigarette ashes, for example, melt holes in fabrics of crystalline synthetic fibers. The formation of a melt from such fibers presents a fire hazard.

In contrast to the above difficulties, the fibers of this invention lacking true crystallinity do not suffer from these disadvantages. When these fibers are cross-linked, either through combining with an external reagent or reacting with internal groups, the composition can be readily hand-tailored to give desired properties and effects. Since cross-linked polymers do not melt, fusing of fabrics, melting, and fire-propagation are avoided.

The process of this invention permits use of high molecular weights, higher than are suitable in solvent spinning or melt spinning. High molecular weights are of distinct advantage because they provide better tensile strength properties, including elongation. Also, in uses where degradation may occur, high molecular weights provide better leeway. The advantages of spinning from compositions possessing the unusual combination of high solids and low viscosity have already been mentioned. The advantages of a wide choice of starting materials, hand-tailoring to secure the properties desired, the simplicity of the over-all operation and its economy are all of real importance.

We claim:

1. A process for preparing self-supporting fibers, filaments, yarns, and films of thermoplastic polymeric materials which comprises forming an aqueous dispersion of particles of a thermoplastic material comprising a water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, said material having an apparent second order transition temperature of at least about 25° C., being dispersed with an emulsifying agent in stable aqueous dispersion at particle sizes below about two microns, said particles constituting at least 20% by weight of the dispersion, passing said dispersion as a stream through an orifice directly into an aqueous coagulating bath containing 5% to 50% by weight of an alkaline material selected from the group consisting of alkali metal hydroxides and quaternary ammonium hydroxides and having a pH of at least 8, whereby a shaped product is formed in the bath by coagulation of said stream, drawing the shaped product at a substantially constant speed through, and then out of, the bath, washing the shaped product, and heating it in a zone held at a temperature of at least 60° C. for a time sufficient to (1) bring the product above its apparent second order transition temperature but below the temperature at which chemical decomposition occurs, (2) dry said product, and (3) cause coalescence of particles therein.

2. A process for preparing self-supporting fibers, filaments, and yarns of thermoplastic polymeric materials which comprises forming an aqueous dispersion of particles of a thermoplastic material comprising a water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, said material having an apparent second order transition temperature of at least about 25° C., being dispersed with an emulsifying agent in stable aqueous dispersion at particle sizes below about two microns, said particles constituting at least 20% by weight of the dispersion, passing said dispersion as a stream through the orifices of a multi-holed spinneret directly into an aqueous coagulating bath containing 5% to 50% by weight of an alkaline material selected from the group consisting of alkali metal hydroxides and quaternary ammonium hydroxides and having a pH of at least 8, whereby a multifilament product is formed in the bath by coagulation of said stream, drawing the multifilament product at a substantially constant speed through, and then out of, the bath, washing the multifilament product, heating it in a zone held at a temperature of at least 60° C. for a time sufficient to (1) bring the product above its apparent second order transition temperature but below the temperature at which chemical decomposition occurs, (2) dry said product, and (3) cause coalescence of particles therein, and stretching the multifilament product.

3. A process for preparing strong, self-supporting fibers, filaments, yarns, and films of thermoplastic polymeric materials which comprises forming an aqueous dispersion of particles of a thermoplastic material comprising a water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, said material having an apparent second order transition temperature of at least about 25° C., being dispersed with an emulsifying agent in stable aqueous dispersion at particle sizes below about two microns, said particles constituting at least 20% by weight of the dispersion, passing said dispersion as a stream through an orifice directly into an aqueous coagulating bath containing 5% to 50% by weight of an alkaline material selected from the group consisting of alkali metal hydroxides and quaternary ammonium hydroxides and having a pH of at least 8, whereby a shaped product is formed in the bath by coagulation of said stream, drawing the shaped product at a substantially constant speed through, and then out of, the bath, washing the shaped product, heating it in a zone held at a temperature between 60° and 400° C. for a time sufficient to (1) bring the product above its apparent second order transition temperature but below the temperature at which chemical decomposition occurs, (2) dry said product, and (3) cause coalescence of particles therein, and stretching the shaped product 50% to 2000%.

4. A process for preparing strong, self-supporting fibers, filaments, yarns, and films of thermoplastic polymeric materials which comprises forming an aqueous dispersion of particles of a thermoplastic material comprising a water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, said material having an apparent second order transition temperature between about 25° and 100° C., being dispersed with an emulsifying agent in stable aqueous dispersion at particle sizes below about two microns, said particles constituting at least 20% by weight of the dispersion, passing said dispersion as a stream through an orifice directly into an aqueous coagulating bath containing 5% to 50% by weight of an alkaline material selected from the group consisting of alkali metal hydroxides and quaternary ammonium hydroxides and having a pH of at least 8, whereby a shaped product is formed in the bath by coagulation of said stream, drawing the shaped product at a substantially constant speed through, and then out of, the bath, washing the shaped product, heating it in a zone held at a temperature between 60° and 400° C. for a time sufficient to (1) bring the product above its apparent second order transition temperature but below the temperature at which chemical decomposition occurs, (2) dry said product, and (3) cause coalescence of particles therein, and stretching the shaped product 50% to 2000%.

5. A process for preparing strong, self-supporting fibers, filaments, yarns, and films of thermoplastic polymeric material which comprises passing an aqueous dispersion of particles of a thermoplastic water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, having an apparent second order transition temperature between about 25° and about 100° C., said particles being dispersed with an emulsifying agent at particle sizes below two microns and constituting between 20% and 65% by weight of the aqueous dispersion, through an orifice as a stream directly into an aqueous coagulating bath containing 5% to 50% by weight of an alkaline material selected from the group consisting of alkali metal hydroxides and quaternary ammonium hydroxides, having a pH above 8, and being at a temperature from 30° to about 105° C., whereby a shaped product is formed in the bath by coagulation of said stream, drawing the shaped product at a substantially constant speed through, and then out of, the bath, washing the shaped product, heating it in a zone held at a temperature which is between 60° and 400° C., the temperature and time of the shaped product in this zone being sufficient (1) to bring it above its apparent second order transition temperature but below the temperature at which chemical decomposition occurs, (2) to dry said product, and (3) to cause coalescence of particles therein, and stretching the product 50% to 2000% under tension.

6. A process for preparing strong, self-supporting fibers, filaments, yarns, and films of thermoplastic polymeric material which comprises passing a stable aqueous dispersion of particles of a fusible, solvent-soluble, water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, as a stream through a shaping orifice into a coagulating bath, said copolymer having an apparent second order transition temperature between about 25° and 100° C., the particles thereof being dispersed with an emulsifying agent at a particle size below two microns and constituting between 20% and 65% by weight of the aqueous dispersion, said coagulating bath being at a pH of at least 12, having dissolved therein 5% to 50% by weight of an alkali metal hydroxide, and being at a temperature between 30° and 105° C., whereby a shaped product is formed in the bath by coagulation of the stream, drawing the shaped product at a substantially constant speed through, and then out of, the bath, washing it, passing it through an environment which is between 60° and 400° C. for a time sufficient to bring the shaped product above its apparent second order transition temperature but below a temperature at which chemical decomposition occurs, whereby the shaped product is dried and the particles thereof are coalesced, stretching the dried product with heating under tension, and cooling the resulting product below its apparent second order transition temperature.

7. A process for preparing strong, self-supporting fibers, filaments, yarns, and films of thermoplastic polymeric material which comprises passing a stable aqueous dispersion of particles of a solvent-soluble, water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, through a shaping orifice as a stream into a coagulating bath, said copolymer having an apparent second order transition temperature between 25° and 100° C., the particles thereof being dispersed with an emulsifying agent at particles sizes below two microns and constituting between 20% and 65% by weight of the aqueous dispersion, said coagulating bath being at a pH of at least 12, having dissolved therein 10% to 40% by weight of an alkali metal hydroxide, and being at a temperature between 30° and 105° C., whereby a shaped product is formed in the path by coagulation of the stream, drawing the shaped product at a substantially constant speed through, and then out of, the bath, washing said product with an aqueous solution of 1% to 20% by weight of an organic carboxylic acid, heating the washed shaped product between 100° C. and 250° C., whereby the shaped product is freed of water and the particles thereof are coalesced, and heating the shaped product between 80° and 250° C. and stretching it 300% to 1000%.

8. A process for preparing strong, self-supporting fibers, filaments, yarns, and films of thermoplastic polymers which comprises passing a stable aqueous dispersion of particles of a copolymer of acrylic esters of saturated monohydric alcohols through a shaping orifice as a stream into a coagulating bath, said copolymer having an apparent second order transition temperature between 30° and 85° C., the particles thereof being dispersed with an emulsifying agent at particle sizes below two microns and constituting 20% to 65% by weight of the aqueous dispersion, said coagulating bath containing 10% to 40% by weight of an alkali metal hydroxide and having a pH of at least 12 and being at a temperature between 30° and 105° C., whereby a shaped product is formed in the bath by coagulation of the stream, drawing the shaped product at a substantially constant speed through, and then out of, the bath, washing said product, heating the washed product between 100° and 250° C., whereby the product is freed of water and the particles thereof are coalesced, and heating the dried product between 80° and 250° C., and stretching the heated dried product 50% to 2000%.

9. A process for preparing strong, self supporting fibers, filaments, yarns, and films of thermoplastic polymers which comprises passing a stable aqueous dispersion of particles of a copolymer of acrylonitrile and an acrylic ester of a lower alkanol through a shaping orifice as a stream into a coagulating bath, said copolymer having an apparent second order transition temperature between 30° and 85° C., the particles thereof being dispersed with an emulsifying agent at particle sizes below two microns and constituting 20% to 65% by weight of the aqueous dispersion, said coagulating bath containing 10% to 40% by weight of an alkali metal hydroxide, having a pH of at least 12, and being at a temperature between 30° and 105° C., whereby a shaped product is formed in the bath by coagulation of the stream, drawing the shaped product at a substantially constant speed through, and then out of, the bath, washing said product, heating the washed product between 100° and 250° C., whereby the product is freed of water and the particles thereof are coalesced, and heating the dried product between 80° and 250° C. and stretching the heated dried product 50% to 2000%.

10. A process for preparing strong, self-supporting fibers, filaments, yarns, and films of thermoplastic polymeric materials which comprises forming an aqueous dispersion of particles of a thermoplastic water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, which copolymer has an apparent second order transition temperature between 25° and 100° C. and contains chemically reactive groups, the particles thereof being dispersed in an aqueous medium with an emulsifying agent at particle sizes below two microns and constituting at least 20% by weight of the dispersion, passing said dispersion through a shaping orifice as a stream into an aqueous coagulating bath containing 5% to 50% by weight of an alkali metal hydroxide dissolved therein and having a pH above a value of eight, whereby a shaped object is formed in the bath by coagulation of the stream, drawing the shaped product at a substantially constant speed through, and then out of, the bath, washing the shaped object, heating it in a zone at a temperature between 60° and 400° C., bringing it above its apparent second order transition temperature but below the temperature at which chemical decomposition occurs for a time sufficient to dry said object and cause coalescence of the particles thereof, treating the shaped object with a compound having radicals polyfunctionally and complementally reactive with the chemically reactive groups of the copolymer, heating the thus treated shaped object, and heat-stretching it.

11. The process of claim 10 wherein the copolymer contains epoxy groups as the chemically reactive groups thereof and the said compound is an alkylene polyamine.

12. The process of claim 11 wherein the alkylene polyamine is ethylene diamine.

13. A process for preparing strong, self-supporting fibers, filaments, yarns, and films of thermoplastic polymeric materials which comprises forming an aqueous dispersion of particles of thermoplastic material comprising a water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, which material has an apparent second order transition temperature between 25° and 100° C. and contains several kinds of chemically reactive groups, the particles thereof being dispersed in an aqueous medium with an emulsifying agent at particle sizes below two microns and constituting at least 20% by weight of the dispersion, passing said dispersion through a shaping orifice as a stream into an aqueous coagulating bath containing 5% to 50% by weight of an alkali metal hydroxide dissolved therein and having a pH above a value of eight, whereby a shaped object is formed in the bath by coagulation of the stream, drawing the shaped product at a substantially constant speed through, and then out of, the bath, washing the shaped object, heating it in a zone at a temperature between 60° and 400° C., bringing it above its apparent second order transition temperature but below the temperature at which chemical decomposition occurs for a time sufficient to dry said object and cause coalescence of the particles thereof, heating the shaped object and stretching it, and continuing the heating until reaction has occurred between the several kinds of chemically reactive groups within the material.

14. The process of claim 13 wherein the copolymer contains as reactive groups epoxy groups and amine groups having hydrogen on the nitrogen thereof.

15. A process for preparing strong, self-supporting fibers, filaments, yarns, and films of thermoplastic polymeric materials which comprises forming a first aqueous dispersion of particles of a thermoplastic water-insoluble copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, which copolymer has an apparent second order transition temperature between 25° and 100° C. and contains one kind of chemically reactive groups, preparing a second aqueous dispersion of particles of a thermoplastic water-insoluble copolymer of a mixture of coplymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, which latter copolymer has an apparent second order transition temperature between 25° and 100° C. and contains groups reactive with the groups of the copolymer in the first aqueous dispersion, mixing the first and second aqueous dispersions, the particles of these dispersions being dispersed in an aqueous mixture with an emulsifying agent at particle sizes below two microns and constituting at least 20% by weight of the mixed dispersions, passing the mixed dispersion through a shaping orifice as a stream into a coagulating bath containing 5% to 50% by weight of an alkali metal hydroxide dissolved therein and having a pH above a value of eight, whereby a shaped object is formed in the bath by coagulation of the stream, drawing the shaped product at a substantially constant speed through, and then out of, the bath, washing the shaped object, heating it in an environment between 60° and 400° C., bringing it above its apparent second order transition temperature but below the temperature at which chemical decomposition occurs for a time sufficient to dry said object and cause coalescence of the particle thereof, heating the shaped object and stretching it, and continuing the heating until reaction occurs between the several kinds of reactive groups of the copolymers.

16. The process of claim 15 wherein the reactive groups of the first dispersion are carboxyl groups and the reactive groups of the second dispersion are epoxy groups.

References Cited in the file of this patent

UNITED STATES PATENTS

| 2,344,511 | Harder | Mar. 21, 1944 |
| 2,530,362 | Morris | Nov. 14, 1950 |
| 2,559,750 | Berry | July 10, 1951 |
| 2,627,088 | Alles | Feb. 3, 1953 |
| 2,685,707 | Llewellyn | Aug. 10, 1954 |
| 2,737,436 | Le Boeuf | Mar. 6, 1956 |

FOREIGN PATENTS

| 437,604 | Great Britain | Oct. 28, 1935 |